United States Patent [19]
Romi

[11] Patent Number: 5,275,550
[45] Date of Patent: Jan. 4, 1994

[54] HYDROMECHANIC MOLD CLAMPING MECHANISM

[75] Inventor: Romeu Romi, Vila Romi, Brazil

[73] Assignee: Industrias Romi S.A., Brazil

[21] Appl. No.: 945,161

[22] Filed: Sep. 15, 1992

[30] Foreign Application Priority Data

Sep. 16, 1991 [BR] Brazil .................. 9103957

[51] Int. Cl.⁵ .............................................. B29C 45/68
[52] U.S. Cl. ........................... 425/589; 425/595; 425/450.1; 425/451.9; 425/DIG. 221
[58] Field of Search ............. 425/595, 589, 450.1, 425/451, 451.9, 454, DIG. 221

[56] References Cited

U.S. PATENT DOCUMENTS

| | | | |
|---|---|---|---|
| 3,590,436 | 7/1971 | Akesson | 425/595 |
| 4,106,885 | 8/1978 | Poncet | 425/595 |
| 4,504,208 | 3/1985 | Kurumaji et al. | 425/595 |
| 4,571,169 | 2/1986 | Shima et al. | 425/451.9 |
| 4,874,309 | 10/1989 | Kushibe et al. | 425/595 |
| 4,984,980 | 1/1991 | Ueno | 425/595 |
| 5,035,606 | 7/1991 | Zakich | 425/451.9 |
| 5,066,217 | 11/1991 | Fukuzawa et al. | 425/595 |
| 5,129,817 | 7/1992 | Ing et al. | 425/595 |
| 5,160,750 | 11/1992 | Holbrook | 425/451.9 |

*Primary Examiner*—Khanh P. Nguyen
*Attorney, Agent, or Firm*—Steinberg & Raskin

[57] ABSTRACT

A hydromechanic mold clamping mechanism for injection molding machines including a movable mold carrying plate provided with hydraulic cylinder rods linked to a fixed mold carrying plate. In accordance with the invention, movable carrying plate (2) receives four sets of hydromechanic mechanisms (6) independently mounted on said movable carrying plate (2) through set of support rods (12 and 13) fixed to said movable plate (2), supporting hydromechanic sets (6) respectively.

19 Claims, 7 Drawing Sheets

HYDROMECHANIC MOLD CLAMPING MECHANISM

BACKGROUND OF THE INVENTION

The present invention refers to a mold closing and clamping mechanism or more precisely to a closing and clamping hydromechanic mechanism provided with two mold carrying plates, being one movable and the other fixed, used on plastic injection molding machines, being that said clamping mechanism now proposed mounted directly on the movable plate of injection molding machines.

Although all known hydromechanic injection molding machines are provided with mold carrying plates closing and clamping mechanism, they differ among themselves in respect to the mechanism design and its mode of operation as is the case of the present invention.

SUMMARY OF THE INVENTION

The main objective of the present invention is to provide a mold closing and clamping mechanism which consists basically of four hydromechanic mechanism sets directly mounted on one of the faces of the movable mold carrying plate of an injection molding machine so that said sets of mechanism perform the mold final closing operation with full clamping force.

Another objective of the present invention is to provide four hydromechanic mechanism sets, each one consisting of a high pressure hydraulic cylinder for final closing of the movable plate against the fixed plate and also consisting of hydraulically operated mechanical auxilliary clamping elements acting on circular grooves existing on each of the four tie bars for clamping said movable plate.

It is still another object of the present invention to provide injection molding machines with hydraulic and electronic control means that make possible the simultaneous closing of the mechanical auxiliary clamping elements being these last ones mounted on each said hydraulic cylinder enabling also perfect control of the mold height adjustment.

A further objective of the present invention is to make possible that each of the four hydromechanic sets may be manufactured independently one from the other, forming a set in itself, which design substantially reduces manufacturing costs by reducing parts machining time due to the simpler design of said parts as well as reducing final machine assembling time.

These and other objectives and advantages of the present invention are reached with a mold closing mechanism which consists in providing a mold carrying plate closing system equipped with two hydraulic actuators, consisting each one of hydraulic cylinder fixed to the fixed plate and rod linked to the movable plate, being this last one as said before provided in its rear face with four hydromechanic clamping sets.

The mechanism now proposed as the whole injection molding machine can be controlled by either a logic programmable control (LPC) or computerized numerical control (CNC).

The objectives, features and advantages of the present invention will be understood from the following description of preferred embodiments when read in connection with the accompanying drawings.

The novel features which are considered basic points for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

In accordance with the illustrations, the mold closing and clamping mechanism object of the present invention, consists basically of four hydromechanic clamping sets 6, each one comprehending a high pressure hydraulic cylinder 7, ring shaped piston 8 and two mechanical clamps 9 and 10 opposite to each other and each one equipped with hydraulic actuator 11, movable mold carrying plate 2, fixed mold carrying plate 3, having this last one linked to it two hydraulic cylinders 4 with their respective rods 5 linked to movable mold carrying plate 2 and four tie bars 17 provided with circular grooves 18 where clamps 9 and 10 actuate to clamp and unclamp movable plate 2 in relation to tie bars 17.

Figure 4:
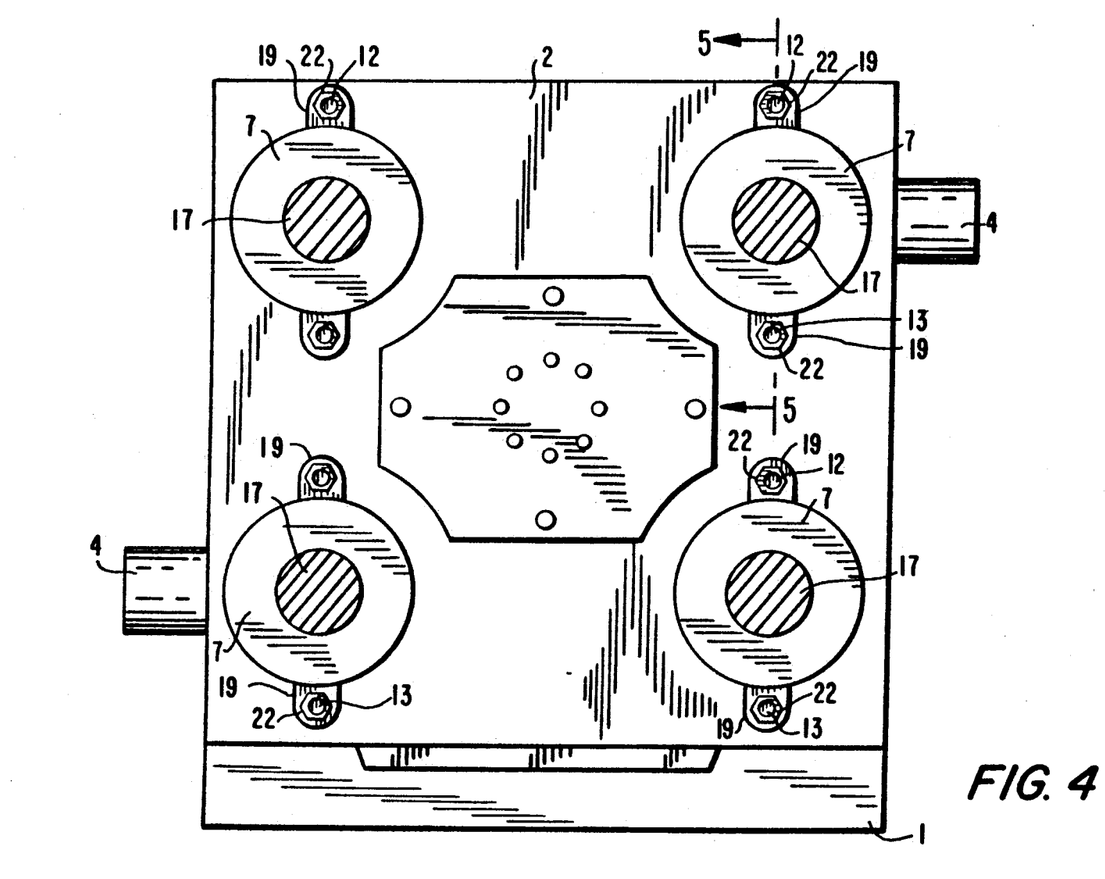
FIG. 4 is a section according to line 4—4 of FIG. 2 illustrating the four hydromechanic sets.
Figure 5:
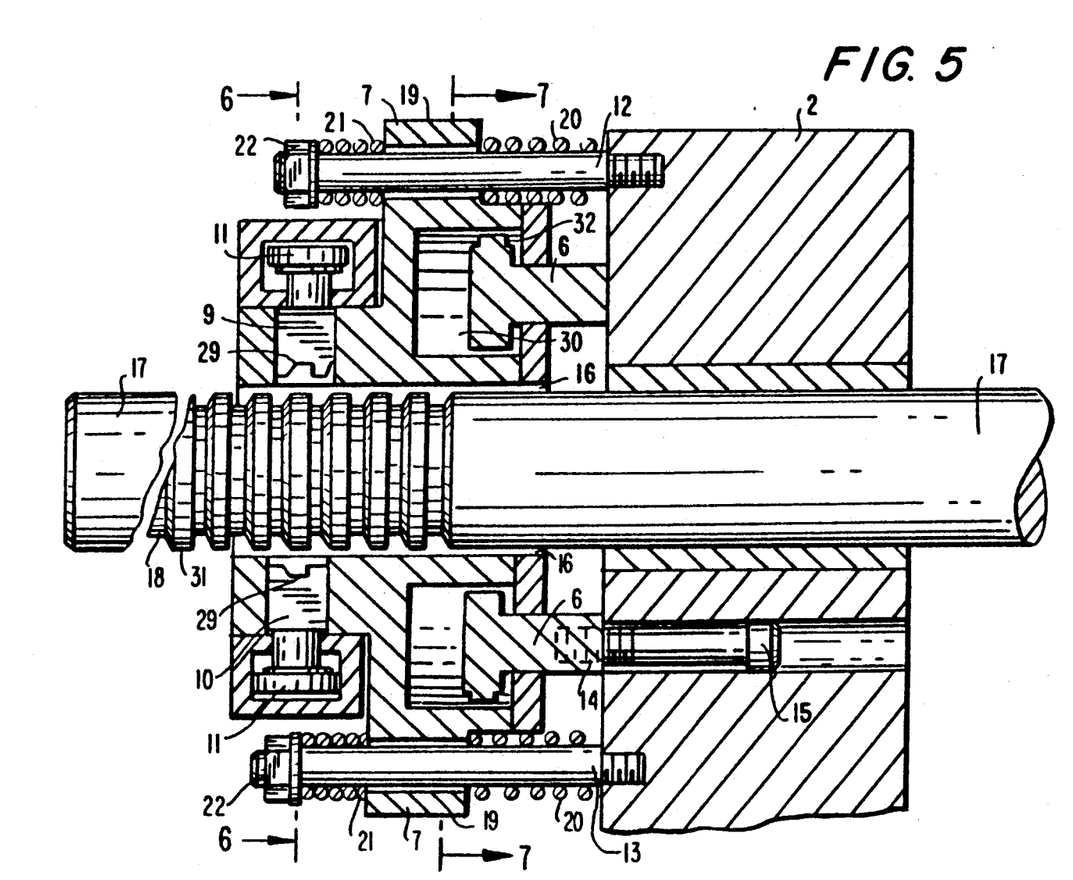
FIG. 5 is an enlarged section illustrating details according to line 5—5 of FIG. 4, one of the four hydromechanical clamping sets mounted on the rear side of the movable plate.

According to FIG. 4 and FIG. 5, the mechanical connection of the four hydromechanic clamping sets 6 to movable plate 2 consists of rods 12 and 13 rigidly fixed to it for assembly and support of said hydromechanic clamping sets 6, being their respective ring shaped pistons 8 provided with threaded holes 14 for fastening them to the rear side of movable plate 2 through a plurality of screws 15. Each hydraulic cylinder 7 is provided with hole 16 through which trespass said tie bar 17 provided with circular grooves 18 which house selectively and periodically semicircular ends 29 of said mechanical clamps 9 and 10 actuated by hydraulic actuators 11. Hydraulic cylinders 7 still incorporate two eyelets 19 which permit passage of said rods 12 and 13, provided with coil springs 20 and 21 axially mounted on said rods 12 and 13 and pressed by adjusting nuts 22 threaded to said rods 12 and 13.

Figure 6:
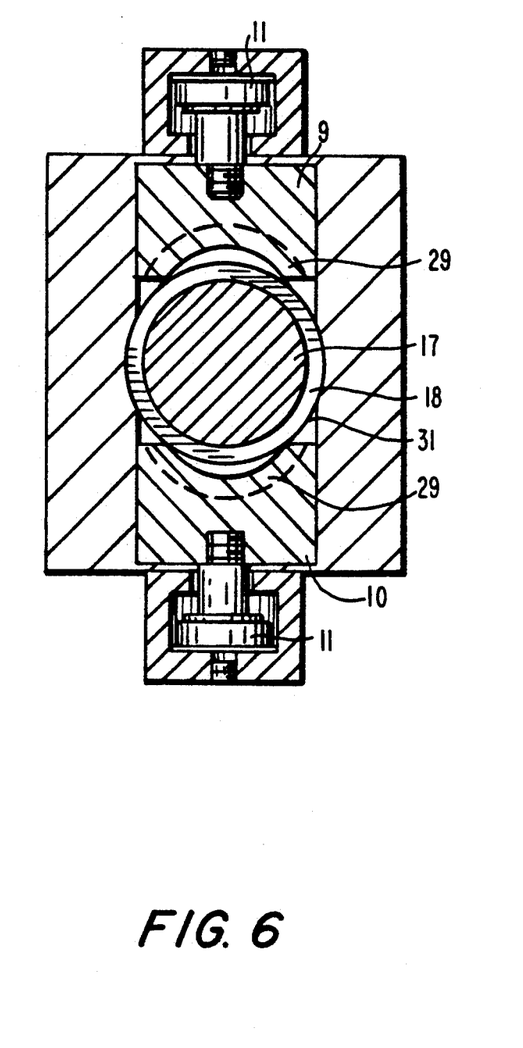
FIG. 6 is an enlarged section of the mechanical clamps of the mechanism taken according to line 6—6 of FIG. 5.
Figure 7:
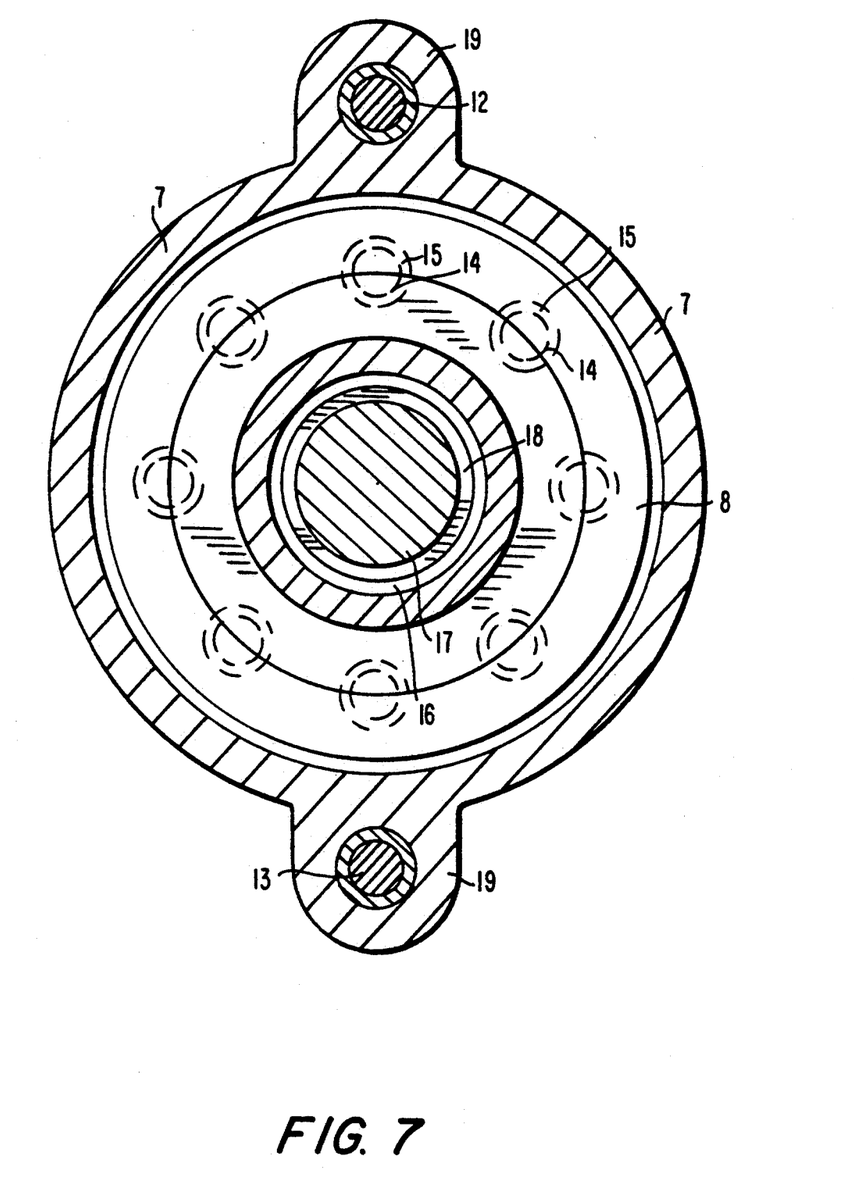
FIG. 7 is an enlarged section of one of the hydraulic cylinders of the hydromechanic mechanism taken according to line 7—7 of FIG. 5.

Said coil springs 20 and 21 perform the function of absorbing elements to the hydromechanic sets 6 movements when closing or opening said movable carrying plate 2 when said clamps 9 and 10 are in the open position as illustrated in FIGS. 5 and 6.

Figure 1:
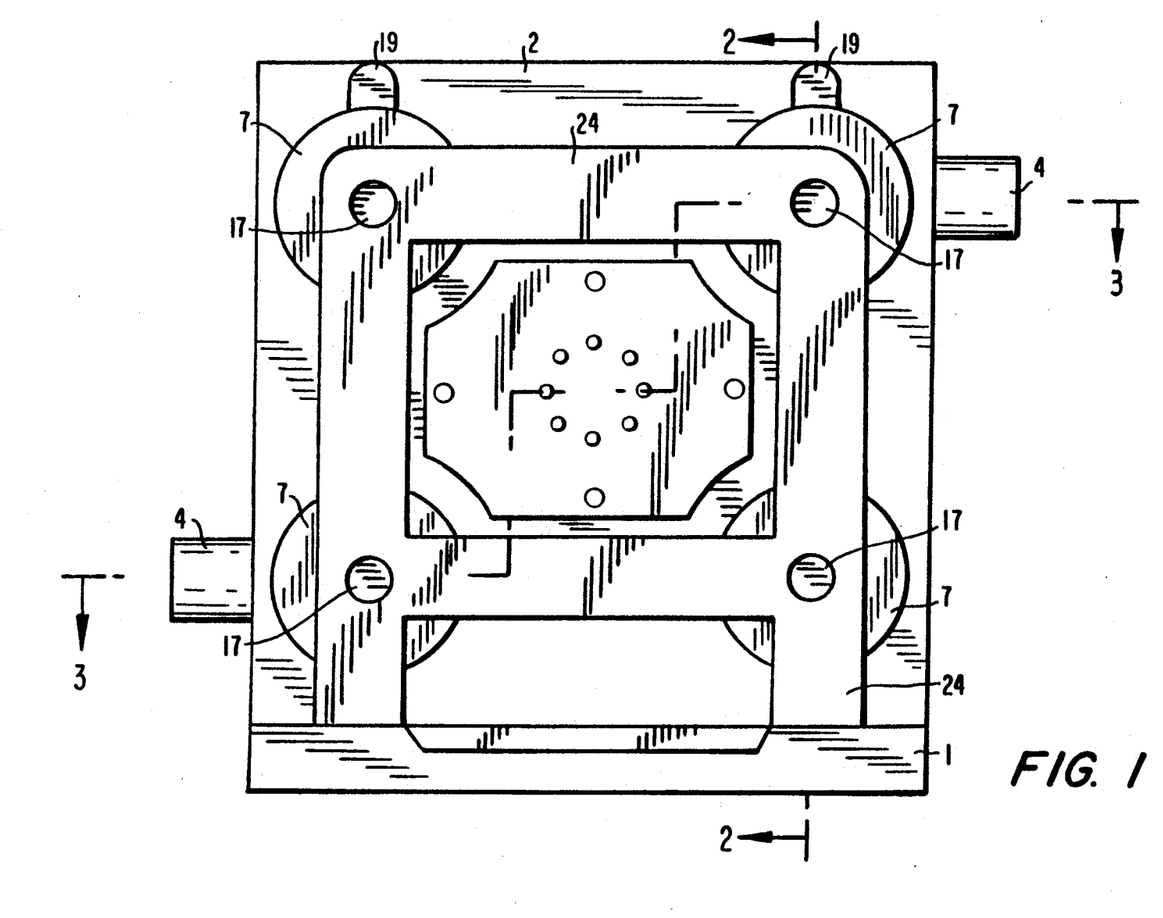
FIG. 1 is a left side view of the injection molding machine provided with the mold closing and clamping mechanism of the present invention, illustrating tie bars rear support, the ejection plate and a portion of the hydromechanic clamping sets illustrated behind the rear support.
Figure 2:
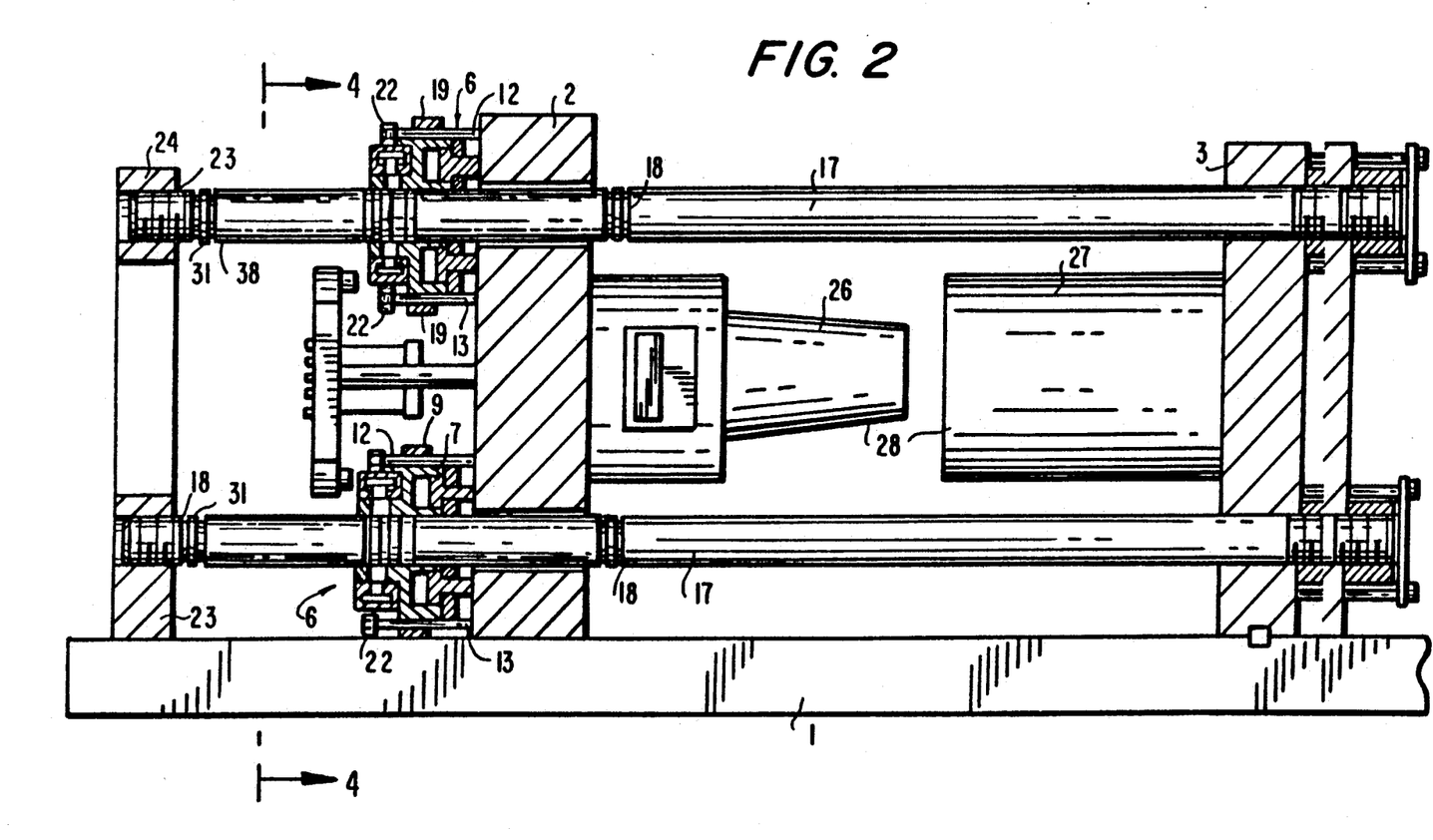
FIG. 2 is a longitudinal section on a vertical plane of a portion of an injection molding machine taken according to line 2—2 of FIG. 1, showing the movable carrying plate in the opened position.

Tie bars 17 have their right ends fixed to the external side of fixed mold carrying plate 3, and left ends freely supported and passing on holes 23 of support 24, being said fixed plate 3, said movable plate 2 and support 24 supported by base 1 of the injection molding machine as illustrated in FIG. 2.

Figure 3:
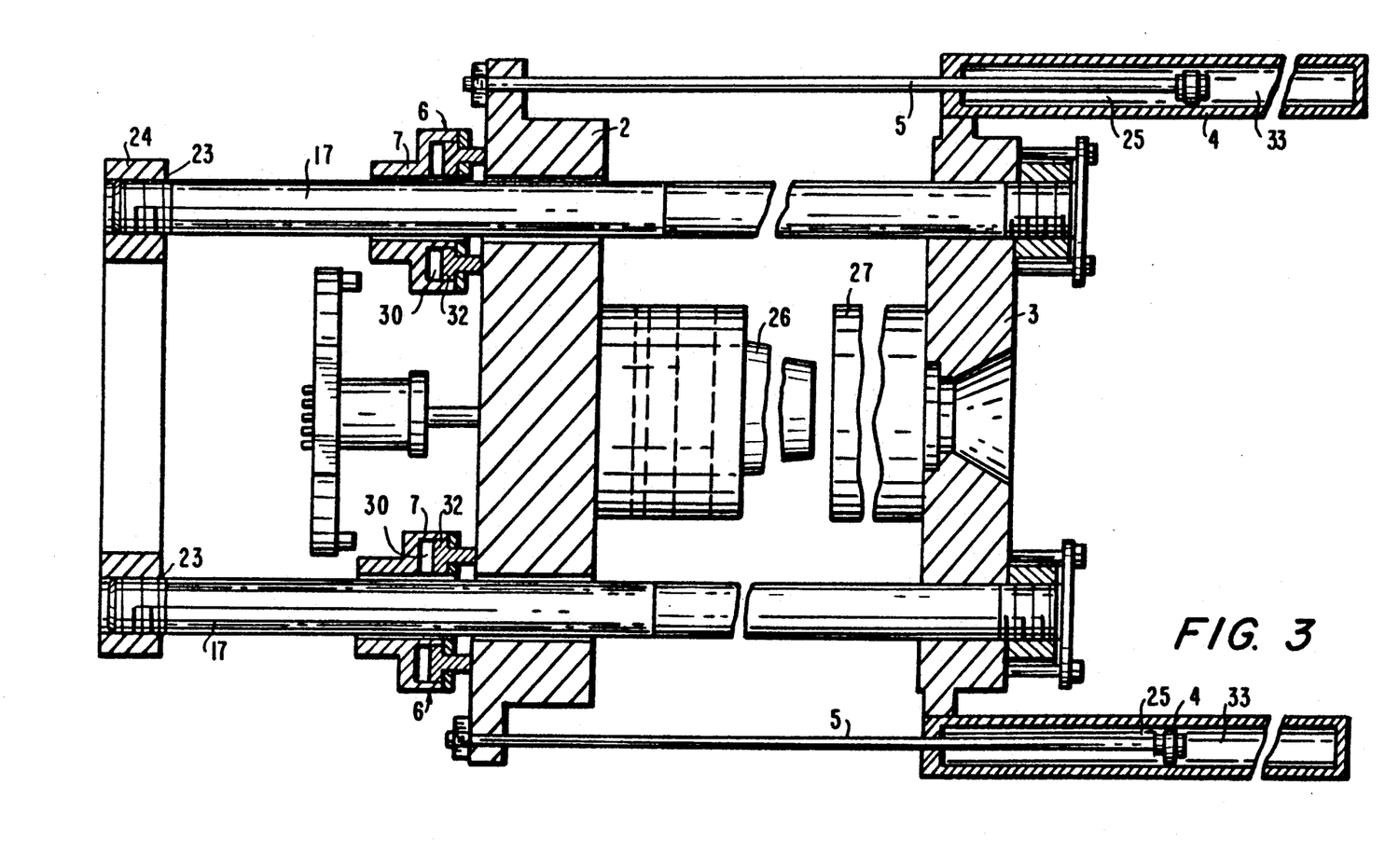
FIG. 3 is a section according to line 3—3 of FIG. 1, illustrating two of four hydromechanic sets for clamping the movable plate, one located at the top and the other at the bottom, the molded parts ejecting plate, and two hydraulic cylinders for moving movable plate, being one at the top front and the other at the bottom rear.

The operation of the injection molding machine pursuant to the present invention is described starting from a certain moment or position of the closing phase of movable plate 2 and against fixed plate 3, such condition that in FIG. 2 shows movable mold carrying plate 2 in the open position and moving towards mold closing direction, being mechanical clamps 9 and 10 of closing hydromechanic sets 6 in the open position, that is, in the unclamping condition shown in FIGS. 5 and 6, said motion of movable plate 2 being made in slidable manner on guideways existing on the upper part of base 1. The motion of movable plate 2 occurs due to hydraulic oil flow from the hydraulic unit (not shown in the figures) entering under pressure in chambers 25 of hydraulic cylinders 4, being these linked to fixed plate 3, as shown in FIG. 3, and displacing respective rods 5 linked to said movable plate 2, until parts 26 and 27 integral to mold 28 reach pre kissing point, at this moment oil flow is interrupted to chambers 25 of hydraulic cylinders 4, stopping displacement of movable plate 2.

Next, when mechanical clamps 9 and 10 of hydromechanic sets 6 are actuated through hydraulic actuators 11, FIGS. 5 and 6, occurs the penetration of semicircular ends 29 of said clamps 9 and 10 in circular grooves 18 of tie bars 17 and right after through the introduction of oil under pressure in chambers 30 of said hydraulic cylinders 7, FIG. 5, are actuated their respective ring shaped pistons 8 which by being linked to movable plate 2 through screws 15, cause the displacement of said movable plate 2 in the direction of full closing of parts 26 and 27 which comprise mold 28, transmitting full clamping force in accordance with the hydraulic pressure prevailing in chambers 30 of said hydraulic cylinders 7.

For better understanding of the pre kissing or pre closing position of mold carrying plates 2 and 3, it is pointed out that a moment before mechanical clamps 9 and 10 close, the four hydromechanic sets 6 are simultaneously positioned for perfect fitting of semi circular ends 29 of said mechanical clamps 9 and 10 in grooves 18 of tie bars 17, that is, without interference between the heads or tops of said ends 29 with heads or tops of integral rings 31 existing between said circular grooves 18, as illustrated in FIG. 5, which takes place by means of known system of electronic control and positioning sensors which purpose is to provide controlled position of hydromechanic sets 6, with respect to the tie bar grooves 18. Positioning takes place when oil is introduced under pressure in chambers 30 or chambers 32 of hydraulic cylinders 7, displacing to the right or to the left said hydraulic cylinders 7, until they reach correct clamping position of mechanical clamps 9 and 10 in circular grooves 18, being that immediately after said closing of said mechanical clamps 9 and 10 occurs, the pressure of hydraulic oil in chambers 30 of hydraulic cylinders 7 rises automatically until it reaches a pre-set value, therefore, occurring total closing of mold 28, the hydraulic oil feed system, not shown in the figures, which feeds hydraulic cylinders 7, provides at all times uniform hydraulic pressure so that each of the four cylinders provide equal clamping force.

Being parts 26 and 27 of mold 28 closed and maintained under pressure exerted by hydromechanic sets 6, the penetration of melted plastic from an injection unit not shown in the figures, occurs in the interior of said mold 28, remaining there until the plastic molded part solidifies completely, after which, being elapsed the curing time for said solid plastic part, the pressure prevailing in chambers 30 of hydraulic cylinders 7 is relieved, decompressing mechanical clamps 9 and 10 which are immediately actuated by hydraulic actuators 11 to assume open position, that is, unclamping tie bars 17, therefore, causing the release of hydraulic sets 6 and of movable plate 2. Under this condition, said movable plate 2 is free to be displaced by rods 5 of hydraulic cylinders 4 through introduction of oil under pressure in chamber 33, providing a displacement to the direction of opening movable plate 2 for removing said molded part, not shown in the figures. After removing the part, the machine control that has been previously programmed restarts the molding operating cycle, causing movable plate 2 and said hydromechanic sets 6 to displace to mold closing direction, repeating the whole cycle described above.

While a preferred construction for hydromechanical molding clamping is described and illustrated, it should be pointed out that structural changes are possible without departing from the spirit of the present invention.

What is claimed as new and desired to be protected by Letters Patent is set forth in the appended claims:

1. A hydromechanic mold clamping apparatus, in particular for injection molding machines in which a portion of the mold is attached to a movable plate, comprising
    a movable mold carrying plate,
    sets of support rods rigidly fixed to said movable plate,
    four sets of hydromechanic mold clamping mechanisms mounted on said movable plate and passing through said sets of support rods,
    each of said sets of hydromechanic mold clamping mechanisms comprising a hydraulic cylinder having an opening for passing a tie bar therethrough, a ring-shaped piston having threaded holes, fastening means arranged in said piston to fasten said piston to said movable plate, mechanical clamps connected to and being actuated by hydraulic actuators to lock said hydromechanic mold clamping mechanism about said tie bar, and eyelets arranged to pass therethrough said sets of support rods such that said hydromechanic mold clamping mechanism axially slides on said sets of support rods.

2. The hydromechanic mold clamping apparatus of claim 1, wherein said fastening means comprise screws.

3. The hydromechanic mold clamping apparatus of claim 1, wherein said mechanical clamps have semi-circular ends arranged to mesh with circular grooves provided in said tie bars.

4. The hydromechanic mold clamping apparatus of claim 1, further comprising impact absorbing elements connected to said support rods.

5. The hydromechanic mold clamping apparatus of claim 4, wherein said impact absorbing elements comprise coil springs.

6. The hydromechanic mold clamping apparatus of claim 5, wherein a first one of said coil springs is arranged on one side of said eyelet and a second one of said coil springs is arranged on an opposite side of said eyelet.

7. The hydromechanic mold clamping apparatus of claim 4, wherein said support rods have a threaded end for threading a pressure adjusting nut, the pressure being exerted by said adjusting nut acting on said impacting absorbing elements.

8. The hydromechanic mold clamping apparatus of claim 1, further comprising a rear support resting on a machine base and having holes arranged therein, and a fixed mold carrying plate, wherein one end of said tie bars is rigidly fastened to said fixed mold carrying plate and an opposite end of said tie bars is freely supported through said holes arranged on said rear support.

9. The hydromechanic mold clamping apparatus of claim 8, further comprising additional hydraulic cylinders connected to said fixed plate, said additional hydraulic cylinders having a movable rod linked to said movable plate such that said movable plate is movable toward and away from said fixed plate.

10. A hydromechanic mold clamping arrangement for injection molding machines, comprising
  a fixed mold carrying plate mounted on a machine base,
  a rear support provided on said machine base, said rear support having a plurality of holes arranged therein,
  a plurality of tie bars arranged parallel to each other, a first end of each of said tie bars being slidably mounted in each of said holes in said rear support,
  a movable carrying plate having openings therein such that each of said tie bars passes through an opening in said movable mold carrying plate, said movable mold carrying plate being arranged between the fixed mold carrying plate and said rear support and having a part of the mold mounted on a first side of said movable mold carrying plate facing said fixed mold carrying plate,
  sets of hydromechanic mold clamping mechanisms, each of said hydromechanic mold clamping mechanisms being independently and slidably mounted on a second side of said movable mold carrying plate opposite to said first side, and
  a pair of support rods for slidably supporting each of said hydromechanic mold clamping mechanisms, said support rods being rigidly fixed to said movable mold carrying plate and passing through said hydromechanic mold clamping mechanism.

11. The arrangement of claim 10, wherein a second part of the mold is mounted on said fixed mold carrying plate such that a desired molded object is formed when said first part of the mold on said movable mold carrying plate contacts said second part of the mold on said fixed mold carrying plate.

12. The arrangement of claim 10, wherein each of said hydromechanic mold clamping mechanisms comprises a hydraulic cylinder having an opening for passing one of said tie bars therethrough, a ring-shaped piston having threaded holes, fastening means arranged in said piston to fasten said piston to said movable mold carrying plate, mechanical clamps connected to and being actuated by hydraulic actuators to lock said hydromechanic mold clamping mechanism about said tie bar, and eyelets arranged to pass therethrough said support rods such that said hydromechanic mold clamping mechanism axially slides on said support rods.

13. The arrangement of claim 12, wherein said fastening means comprise screws.

14. The arrangement of claim 12, wherein said mechanical clamps have semi-circular ends arranged to mesh with circular grooves provided in said tie bars.

15. The arrangement of claim 12, further comprising impact absorbing elements connected to said support rods.

16. The arrangement of claim 15, wherein said impact absorbing elements comprise coil springs, a first one of said coil springs being arranged on one side of said eyelet and a second one of said coil springs being arranged on an opposite side of said eyelet.

17. The arrangement of claim 15, wherein each of said support rods has a threaded end for threading a pressure adjusting nut, the pressure being exerted by said adjusting nut acting on said impacting absorbing elements.

18. The arrangement of claim 10, wherein a second end of said tie bars opposite to said first end is fixed to said fixed mold carrying plate.

19. The arrangement of claim 10, further comprising hydraulic cylinders connected to said fixed mold carrying plate, said hydraulic cylinders having a movable rod linked to said movable plate such that said movable plate is movable toward and away from said fixed mold carrying plate.

* * * * *